United States Patent [19]

Kreuttner

[11] 4,383,672
[45] May 17, 1983

[54] MOLD TOOLING FOR THE MANUFACTURE OF THERMOPLASTIC PARTS

[75] Inventor: Albert Kreuttner, Aalen, Fed. Rep. of Germany

[73] Assignee: Carl Zeiss-Stiftung, Oberkochen, Fed. Rep. of Germany

[21] Appl. No.: 359,059

[22] Filed: Mar. 17, 1982

[30] Foreign Application Priority Data

Mar. 31, 1981 [DE] Fed. Rep. of Germany ....... 3112751

[51] Int. Cl.³ .................... B29C 1/00; B29D 11/00; B29F 1/00
[52] U.S. Cl. .................................. 249/134; 249/102; 249/160; 425/808; 425/405 R; 425/542; 425/192 R
[58] Field of Search ...................... 249/102, 134, 160; 425/808, 405 R, 542, 192, 77, DIG. 26, 461

[56] References Cited

U.S. PATENT DOCUMENTS

| | | | |
|---|---|---|---|
| 2,245,608 | 6/1941 | Rogers | 425/461 |
| 2,298,429 | 10/1942 | Smith | 425/808 |
| 2,304,664 | 12/1942 | Smith | 425/808 |
| 2,357,950 | 9/1944 | Goessling | 425/808 |
| 2,394,941 | 2/1946 | Smith | 425/808 |
| 2,406,361 | 8/1946 | Fairbank et al. | 425/808 |
| 2,424,235 | 7/1947 | Hoffer | 425/808 |
| 2,443,826 | 6/1948 | Johnson | 425/808 |
| 3,079,503 | 2/1963 | Weir et al. | 425/DIG. 26 |
| 3,509,593 | 5/1970 | Kirk | 425/77 |
| 3,605,195 | 9/1971 | Campbell | 425/808 |
| 3,871,611 | 3/1975 | Taketa | 249/102 |
| 4,251,474 | 2/1981 | Blandin | 425/808 |

OTHER PUBLICATIONS

"Miniature Diamond Ultrahigh Pressure Cell Adapted for In-Reactor Irradiation Studies", from the Review of Scientific Instruments, vol. 37, No. 7, pp. 871–873, Jul. 1966.

Primary Examiner—J. Howard Flint, Jr.
Attorney, Agent, or Firm—Hopgood, Calimafde, Kalil, Blaustein & Judlowe

[57] ABSTRACT

The invention contemplates mold tooling adapted for the molding of a variety of thermoplastic parts. The mold comprises two die elements which carry die-insert plugs, and the mutually facing surfaces of these plugs determine the shape of the part to be produced. In order to retain the insert plugs (3, 4) in the die elements (1, 2) in such manner that they can be simply and easily replaced, that surface (7, 8) of an insert plug (3, 4) which faces its supporting die element (1, 2), and that surface (5, 6) of the supporting die element (1, 2) which serves to receive the involved insert plug (3, 4), are developed as polished spherical surfaces of the same radius $R_N$. Each interchangeable insert plug has a spherical seating surface of the same spherical radius $R_N$.

11 Claims, 2 Drawing Figures

MOLD TOOLING FOR THE MANUFACTURE OF THERMOPLASTIC PARTS

BACKGROUND OF THE INVENTION

The present invention relates to a mold construction for the manufacture of parts of thermoplastic material, the mold comprising two die elements, each of which is adapted to replaceably receive and support a die-insert plug, and the mutually facing surfaces of the insert plugs determining the shape of the part to be produced.

Such molds are used for the manufacture of parts by compression-molding or by injection-molding. The latter is particularly desirable since it enables extremely short cycle times and thus high cost-effectiveness. Furthermore, the injection-molding process permits a drastic reduction in the capital investment for a mold through use of so-called standard molds.

Such a standard mold consists of two die elements (or forces) which are clamped together by die-clamping mechanism of the machine. Each die element carries a die-insert or force plug, and the mutually facing surfaces of these plugs determine the shape of the part to be produced. In this connection, each insert plug is in form-locked relation to its supporting die element. If a different part is to be produced, the insert plugs are changed. However, this changing process requires a very long period of time, due to the form-locked connection between each die element and its plug. Change times of several hours are still considered normal.

BRIEF STATEMENT OF THE INVENTION

The object of the present invention is to provide a mold construction which permits of rapid, easy change of involved insert plugs.

The invention achieves this object using a mold of the character indicated wherein, at the supporting interface between each die element and its associated insert plug, both interface surfaces are polished and spherical, to the same radius.

In this connection, it is advantageous to develop the spherical surfaces of the die elements and the insert plugs as standard-radius surfaces. Such spherical surfaces are thus identical for all insert plugs, regardless of the shape of the surfaces which determine the mold cavity. In this way, each insert plug can be simply and rapidly replaced by another plug at any time.

In order to facilitate the replacement of the insert plugs, it is particularly advantageous for the spherical surfaces of both the die element and the insert plugs to be so finely polished that the insert plugs will adhere in their associated die-elements by so-called "wringing", known from calibration with end-measuring instruments.

Another embodiment contemplates providing each spherical surface of a die element with an opening for connection to a vacuum conduit. In the case of injection-molding machines, the required vacuum is directly available from existing conduits. Since the interfacing surfaces of the die element and its insert plug have the same radius, a relatively slight vacuum is sufficient for the dependable mounting of the plug in the die element.

There are cases in which a given insert plug or series of such plugs must be associated with a particular one of the two die elements. In such case, it is advantageous to provide the spherical surface of one die element with a radius which differs from the radius of the spherical surface of the other die element.

Depending on the nature of the material to be molded, various materials may be used for the insert plugs; among these are steel, special glass, glass ceramics, as well as sapphire. Sapphire finds particularly advantageous use when various transparent plastics are to be molded, since it assures easy separation of the molded part from the mold.

The mold construction of the invention is particularly advantageous in the manufacture of eyeglass lenses. In this case, rapid replacement of insert plugs is of great importance since lenses of different optical powers must be produced by the same die-element unit.

The mold of the invention offers a very substantial advantage for the manufacture of eyeglass lenses since practically all toric lenses can be produced easily and without change of plug by turning the force plugs into predetermined orientation.

DETAILED DESCRIPTION

The invention will be described in further detail in conjunction with the accompanying drawings, in which.

Figure 1:
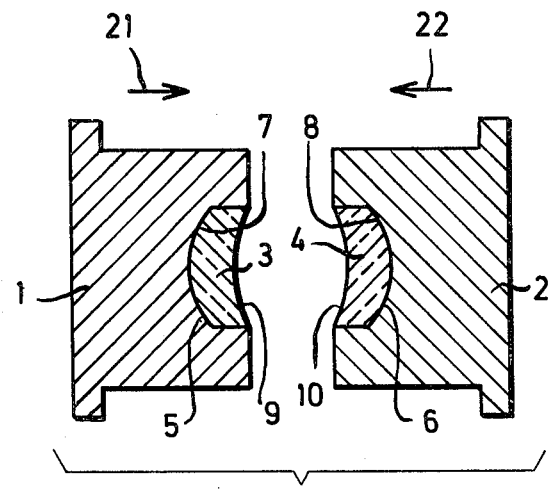
FIG. 1 is a longitudinal section through one mold embodiment.
Figure 2:
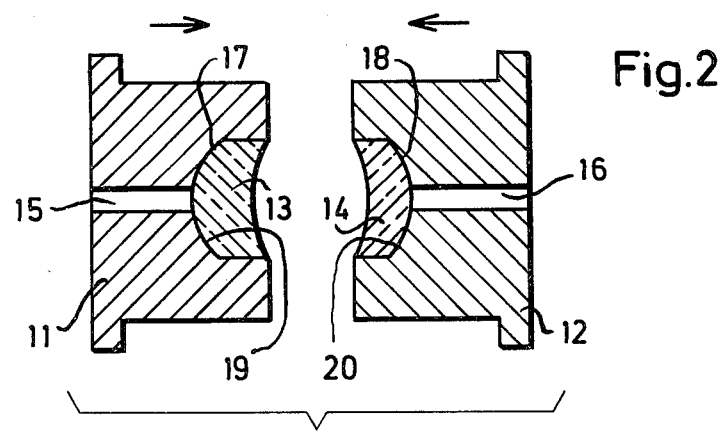
FIG. 2 is a similar section through another embodiment.

In FIGS. 1, 1 and 2 are two coacting die elements (or forces) of a mold, and insert or force plugs 3 and 4 are mounted in the respective elements 1 and 2. The surfaces 5 and 6 of the die elements 1 and 2 which receive the force plugs are developed as polished spherical surfaces having the radius $R_N$. The corresponding surfaces 7 and 8 of the insert or force plugs 3 and 4 are also developed as polished spherical surfaces having the radius $R_N$. The radius $R_N$ is selected as a standard radius.

The plugs 3 and 4 can be replaced by other plugs whose plug surfaces are also developed as polished spherical surfaces having the standard radius $R_N$, regardless of the shape of the surfaces 9 and 10 which determine the mold cavity.

The spherical surfaces 5, 7 and 6, 8 have such a fine polish that plugs 3 and 4 adhere by wringing in their respective supporting die elements 1 and 2.

In molding a part, die elements 1 and 2 will have been moved toward each other in directions indicated by arrows 21, 22, and will have been clamped by the machine-locking pressure, whereupon thermoplastic material is injected under high pressure into the cavity defined by and between surfaces 9 and 10.

Eyeglass lenses of thermoplastic material, such as known for example under the names PMMA, PC, etc., can be produced in particularly advantageous manner with the mold shown in the drawing. In this connection, it is possible, for instance, after a production of one thousand eyeglass lenses of an optical power of +1.5 diopter, to produce one thousand or more eyeglass lenses of +2.5 diopter, etc., by a simple and rapid replacement of the plugs 3 and 4, using replacement plugs having different surfaces 9, 10.

The time required to change plugs 3 and 4 in the mold of the invention is only a few minutes.

In order to produce toric eyeglass lenses, i.e., eyeglass lenses of astigmatic action, a plug is selected with a surface 9 characterized by a torus which corresponds to the desired correction value for the astigmatism. It is then possible, by turning this plug, to impart a desired orientation to the axes of the torus. This is necessary when the other surface of the eyeglass lens is of a non-spherical shape, as for example a continuous-focus surface.

In the embodiment of FIG. 2, the die elements 11 and 12 are provided with holes 15 and 16 which are connected to a vacuum conduit, and the associated plugs 13, 14 are held by the vacuum thus produced.

In the example of FIG. 2, the spherical surfaces 17, 19 of parts 11, 13 have a different radius than the spherical surfaces 18, 20 of parts 12, 14. This may be necessary, for instance, in order to assure application of toric surfaces or continuous-focus surfaces always to a predetermined side of an eyeglass lens.

What is claimed is:

1. A mold for the manufacture of parts of thermoplastic material, said mold consisting of two die elements each of which is developed as support for a force plug, and the facing surfaces of said plugs determining the shape of the part to be produced, characterized by the fact that the surface (7, 8) of each force plug (3, 4) which faces the die element (1, 2) and that the surface (5, 6) of the force (1, 2) which serves to receive said plug (3, 4) are both developed as polished spherical surfaces of the same radius.

2. A mold according to claim 1, characterized by the fact that the spherical surfaces (5, 6 and 7, 8) of the die elements (1, 2) and the force plugs (3, 4) are developed as surfaces of standardized radius.

3. A mold according to claim 1, characterized by the fact that the spherical surfaces (5, 6 and 7, 8) of the die elements (1, 2) and of the force plugs (3, 4) are so finely polished that the force plugs (3, 4) adhere by wringing in the associated die elements (1, 2).

4. A mold according to claim 1, characterized by the fact that spherical surfaces (17, 18) of the die elements (11, 12) are provided with an opening (15, 16) for connection to a vacuum conduit.

5. A mold according to claim 1, characterized by the fact that the spherical surface (17) of one die element (11) has a different radius than the spherical surface (18) of the other die element (12).

6. A mold according to claim 1, characterized by the fact that the force plugs (3, 4) consist of sapphire.

7. A mold according to claim 1, characterized by its use in injection-molding units.

8. A mold according to claim 1, characterized by its use for the production of eyeglass lenses.

9. A mold according to claim 1, characterized by its use for the production of eyeglass lenses in injection-molding units.

10. A mold construction particularly adapted for injection-molding of eyeglass lenses of thermoplastic material, comprising two die elements adapted to be clamped together when defining a mold cavity, each of said die elements being characterized by an insert-retaining cavity having an inner concave spherical surface facing the other die element, and two insert plugs each having a convex spherical surface fitted in a different one of said cavities, the radius of fitted convex and concave spherical surfaces at one die element being the same, and the radius of fitted convex and concave spherical surfaces at the other die element being the same, and a lens-forming cavity surface on the side of each plug opposite the fitted spherical surface thereof.

11. The mold construction of claim 10, in which each insert-retaining cavity is further defined by a concave cylindrical rim, and each insert plug has a convex cylindrical rim fitted to the associated concave cylindrical rim, whereby for an aspherical lens-forming surface on one of said plugs, a rotational orientation adjustment may be made in one with respect to the other of the plugs which cooperatively define the molding cavity.

* * * * *